(12) United States Patent
Fudulea

(10) Patent No.: US 9,561,696 B2
(45) Date of Patent: Feb. 7, 2017

(54) METHOD OF LOCATING VEHICLE WHEELS EQUIPPED WITH AN ELECTRONIC BOX

(71) Applicants: CONTINENTAL AUTOMOTIVE FRANCE, Toulouse (FR); CONTINENTAL AUTOMOTIVE GMBH, Hannover (DE)

(72) Inventor: Olivier Fudulea, Hannover (DE)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 14/647,059

(22) PCT Filed: Nov. 26, 2013

(86) PCT No.: PCT/EP2013/003562
§ 371 (c)(1),
(2) Date: May 22, 2015

(87) PCT Pub. No.: WO2014/082732
PCT Pub. Date: Jun. 5, 2014

(65) Prior Publication Data
US 2015/0306925 A1    Oct. 29, 2015

(30) Foreign Application Priority Data
Nov. 29, 2012 (FR) ...................... 12 61379

(51) Int. Cl.
*B60C 1/00* (2006.01)
*B60C 23/04* (2006.01)
*B60C 23/00* (2006.01)

(52) U.S. Cl.
CPC ......... *B60C 23/0486* (2013.01); *B60C 23/007* (2013.01); *B60C 23/008* (2013.01);
(Continued)

(58) Field of Classification Search
CPC .......................... B60C 23/0433; H01Q 1/2241
(Continued)

(56) References Cited

U.S. PATENT DOCUMENTS

| | | | |
|---|---|---|---|
| 5,400,246 A | * | 3/1995 | Wilson .................. G08B 25/14 340/12.53 |
| 2004/0055372 A1 | | 3/2004 | Lefaure |

(Continued)

FOREIGN PATENT DOCUMENTS

| | | |
|---|---|---|
| CN | 102336231 A | 2/2012 |
| EP | 1 353 812 B1 | 5/2005 |
| EP | 1 826 031 A1 | 8/2007 |

OTHER PUBLICATIONS

International Search Report, dated Jan. 2, 2014, from corresponding PCT application.

*Primary Examiner* — Daryl Pope
(74) *Attorney, Agent, or Firm* — Young & Thompson

(57) ABSTRACT

A method for locating the wheels of a vehicle equipped with an electronic module, according to which the transmission, by transmitting antennas mounted on the vehicle, of a predetermined number of identification request signals is commanded, and the values representative of the rates of reception of these signals by the electronic modules are analyzed. According to the method, centroid calculations are performed to determine, for each wheel position, the "ideal position" $\vec{LA_j}$ for reception of the transmitting antennas covering the wheel position (a reception rate of 100%), and, for each electronic module, the "actual position" of the latter $\vec{WU_i}$ relative to the position $\vec{TA_i}$ of the transmitting antennas (Continued)

Figure 1:
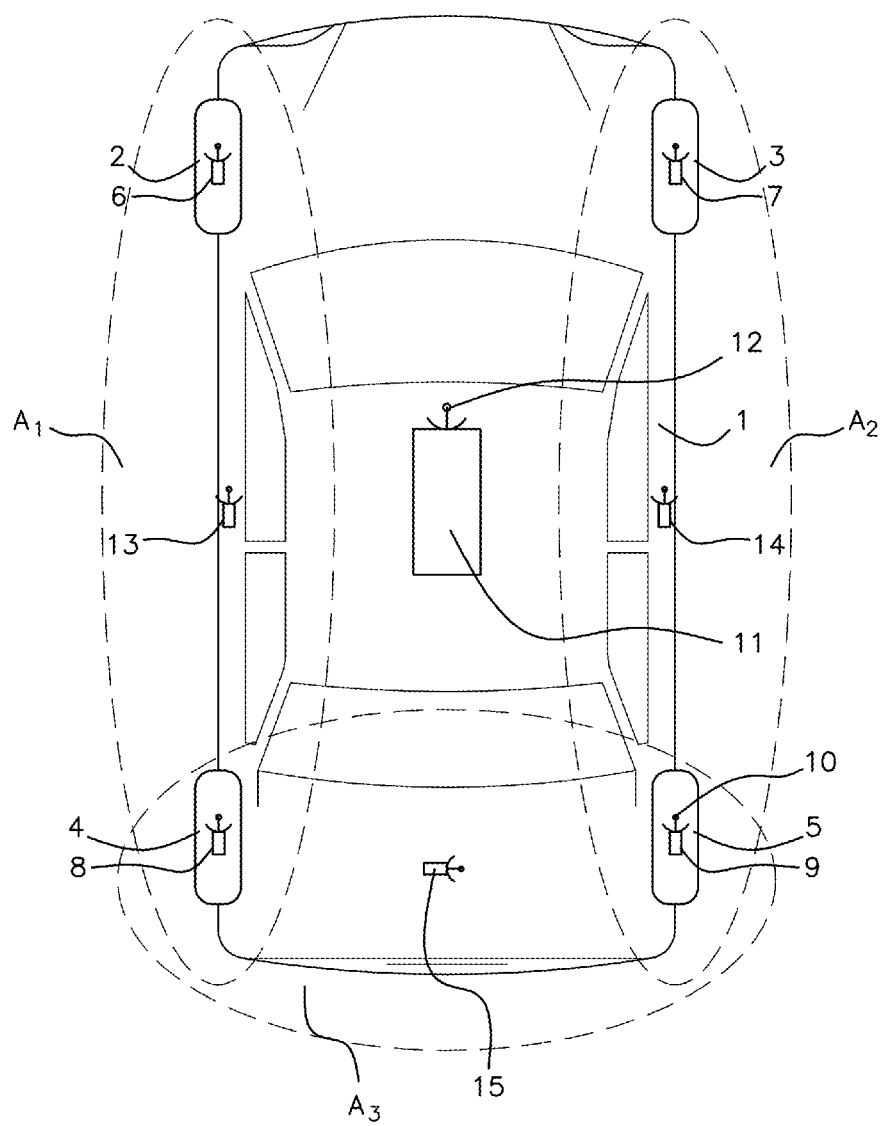

fitted to the vehicle, using as the criterion for determining this "actual position" $\overrightarrow{WU_i}$ the rate of reception, by the electronic module, of the signals transmitted by each transmitting antenna.

15 Claims, 3 Drawing Sheets

(52) U.S. Cl.
CPC ........ *B60C 23/044* (2013.01); *B60C 23/0416* (2013.01); *B60C 23/0433* (2013.01); *B60C 23/0444* (2013.01)

(58) Field of Classification Search
USPC .................................................. 340/442–447
See application file for complete search history.

(56) References Cited

U.S. PATENT DOCUMENTS

| | | |
|---|---|---|
| 2007/0194894 A1 | 8/2007 | Beckley et al. |
| 2007/0200693 A1 | 8/2007 | Costes |
| 2008/0197837 A1* | 8/2008 | Dulac ................. B60C 23/0416 324/207.16 |
| 2009/0144017 A1* | 6/2009 | Penot .................... G08C 17/04 702/150 |
| 2014/0184402 A1* | 7/2014 | Kosugi ............... B60C 23/0489 340/442 |

* cited by examiner

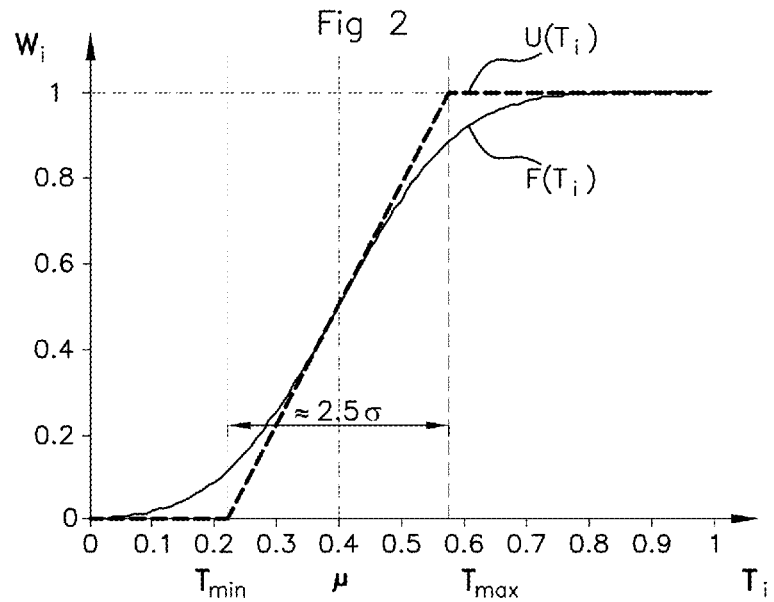
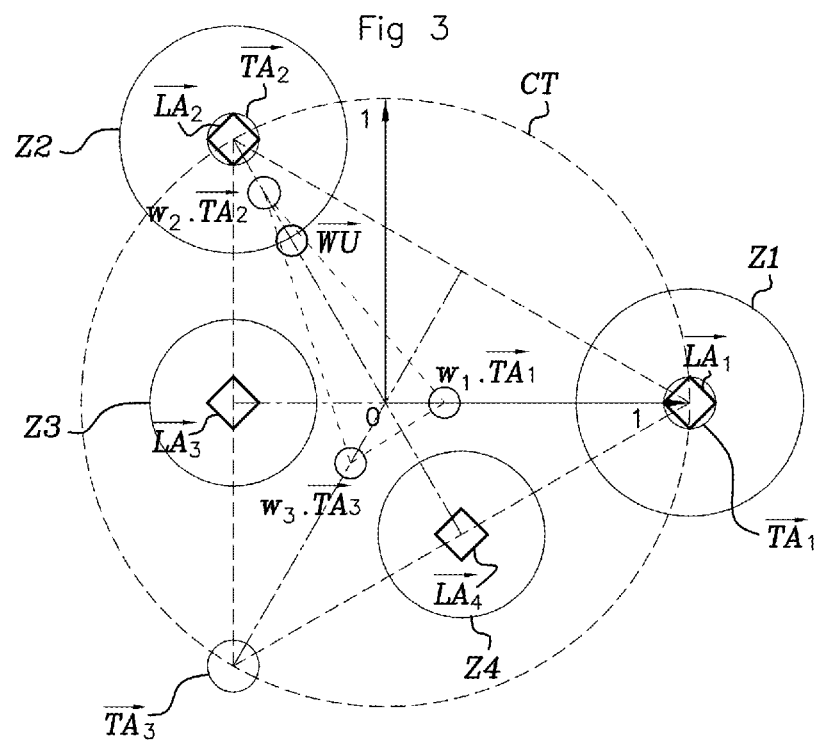

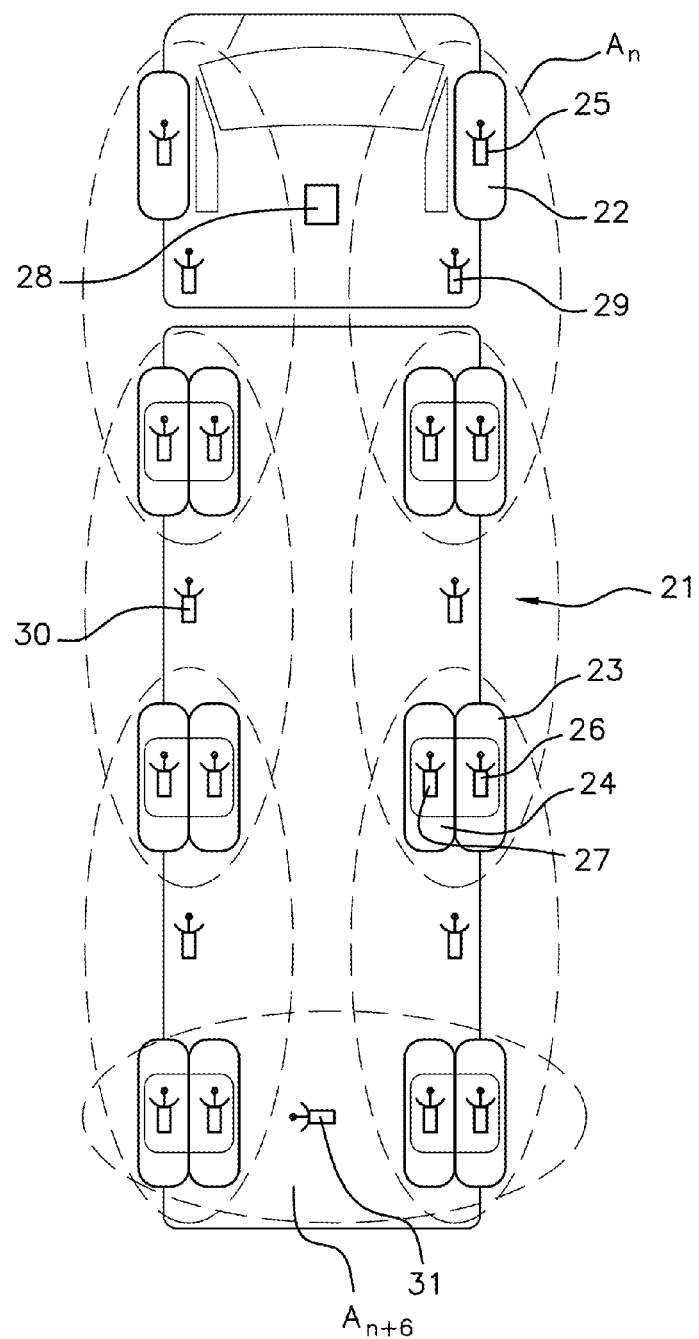

METHOD OF LOCATING VEHICLE WHEELS EQUIPPED WITH AN ELECTRONIC BOX

The invention relates to a method of locating motor vehicle wheels equipped with an electronic module adapted to transmit to a central unit, mounted on the vehicle, signals comprising data representative of operating parameters of each wheel and an identification code of said electronic module.

Increasing numbers of motor vehicles are provided, for safety purposes, with monitoring systems including sensors associated with each of the wheels of the vehicle, used for measuring parameters such as the pressure or temperature of the tires fitted to these wheels, and intended to inform the driver of any abnormal change in the measured parameter.

These monitoring systems are conventionally provided with an electronic module mounted on each of the wheels of the vehicle, incorporating a microprocessor and a radio frequency transmitter in addition to the aforesaid sensors, and with a central unit for receiving the signals sent by the transmitters, including a computer incorporating a radio frequency receiver connected to an antenna.

One of the problems to be resolved by these monitoring systems is that each signal received by the receiver of the central unit is required to be associated with information on the location of the electronic module and therefore of the wheel from which the signal originated, this requirement continuing during the lifetime of the vehicle, meaning that it must be complied with even after wheels have been changed, or, more simply, after the positions of these wheels have been exchanged.

At the present time a first method of location consists in using three low-frequency antennas, each positioned near one of the wheels of the vehicle, and carrying out a location procedure of exciting each of these three antennas successively by transmitting a low frequency magnetic field.

According to this procedure, the electronic module mounted on the wheel located near the excited antenna responds by sending a command to the central unit for the transmission of a low frequency signal including an identification code of said electronic module, in such a way that the successive excitation of the three antennas leads to the location of the three electronic modules mounted on the wheels adjacent to these antennas, and, by deduction, to the location of the fourth electronic module.

The main advantage of this method lies in the fact that the location procedure is very fast and results in virtually instantaneous location after the starting of the vehicle.

On the other hand, with this solution the vehicle has to be equipped with three antennas, with all the consequent constraints, such as connecting cables, control amplifiers and the like, making the solution costly.

This drawback in terms of the installation cost of the means for executing the location method may be overcome if the vehicle is equipped with a hands-free access device for accessing and starting said vehicle.

In this case, the solution, as described, notably, in the patent EP 1 353 812, consists in using the transmitting antennas and associated power supplies of this hands-free access device to carry out the wheel location procedure.

As described in the patent cited above, this solution is executed, for example, by commanding the transmitting antennas to transmit an uncoded signal when the antennas are used for their original purpose of controlling access to the vehicle.

This solution is highly attractive in theory, but in practice it has proved to be very difficult to implement. This is because the antennas of hands-free access devices are not positioned ideally for the purpose of enabling the wheels of a vehicle to be located.

Consequently, in the first place, this form of location can only be made selective by very precise adjustment of the transmission power of the antennas, and generally requires an increase in the sensitivity of the receivers mounted on the wheels, causing these sensors to be sensitive to external interference.

In practice, these extreme adjustment conditions commonly give rise to problems of noise immunity and sensitivity tolerance of the sensors, making the reliability of the location method highly relative.

To overcome these drawbacks, one improvement of this location method consisted in executing a location method, as described, notably, in the patent EP 1 826 031, consisting in:
  successively commanding the transmission of a predetermined number of identification request signals by each transmitting antenna,
  calculating values which are representative, for each electronic module, of the rate of reception $T_i$ by the module of the signals transmitted by each antenna,
  and executing a location procedure which is adapted, by analysis of the values representative of the reception rates $T_i$, to enable a wheel position to be assigned to each electronic module.

This location method therefore consists in commanding the transmission, by each transmitting antenna, of a plurality of identification request signals, so that, statistically, each electronic module located in the coverage area of this transmitting antenna must be contacted with an identification request.

According to this principle, the selective nature of the location procedure is considered to be due to the fact that:
  only the electronic modules located in the coverage area of a transmitting antenna receive a number of identification request signals capable of resulting in their identification,
  the reception of "parasitic" identification request signals by an electronic module located outside the coverage area of a transmitting antenna has no effect, because these "parasitic" signals are automatically "filtered".

This location method is found to perform very well when used on a motor vehicle having two axles (with four wheels, or six wheels including two pairs of twin wheels) and four transmitting antennas. On the other hand, operating problems have been encountered when the vehicles are fitted with only three transmitting antennas. Furthermore, and above all, this location method is strictly limited to vehicles with two axles.

The present invention is intended to overcome these drawbacks, and has the primary aim of providing a location method which performs extremely well in terms of reactivity and reliability.

Another aim of the invention is to provide a location method that can be used in any type of vehicle fitted with tires, regardless of the number of axles on which the tires are placed.

To this end, the invention proposes a method of locating the positions of motor vehicle wheels equipped with an electronic module adapted to transmit to a central unit, mounted on the vehicle, signals comprising data representative of operating parameters of each wheel and an identification code of said electronic module, said location method consisting of:

equipping the vehicle with $N_{TA}$ transmitting antennas positioned in such a way that the coverage area of each transmitting antenna covers at least one wheel position, and that the total coverage area of all the transmitting antennas covers all the wheel positions, successively commanding the transmission of a predetermined number of identification request signals by each transmitting antenna, calculating values which are representative, for each electronic module, of the rate of reception $T_i$ by the module of the signals transmitted by each antenna, and executing a location procedure which is adapted, by analysis of the values representative of the reception rates $T_i$, to enable a wheel position to be assigned to each electronic module.

According to the invention, this location method is characterized in that:

in a preliminary step, a predetermined geometric reference frame is defined, and the following are defined within this reference frame:

the coordinates $\overrightarrow{TA_i}$ of each transmitting antenna, for each wheel position, the coordinates of the centroid $\overrightarrow{LA_j}$, called the reference centroid, of the transmitting antennas whose coverage area covers said wheel position, to each of which is assigned a weighting coefficient $w_i$ in the form of a value representative of a 100% rate of reception $T_i$ of the signals transmitted by said transmitting antenna, the following location procedures are executed:

defining, for each electronic module, the coordinates of the centroid $\overrightarrow{WU_i}$ of the $N_{TA}$ transmitting antennas, to each of which is assigned a weighting coefficient $w_i$ in the form of a value representative of the rate of reception $T_i$, by said electronic module of the signals transmitted by said transmitting antenna, and determining, on the basis of the relative position between the reference centroids $\overrightarrow{LA_j}$ and each of the centroids $\overrightarrow{WU_i}$ representative of an electronic module, the wheel position to be assigned to each of said electronic modules.

The method according to the invention is therefore based on the calculation of the centroids of weighted systems $\{\overrightarrow{TA_i}, w_i\}$, where $\overrightarrow{TA_i}$ signifies the coordinates of the transmitting antennas and $w_i$ are values representative of the rate of reception $T_i$ of the signals transmitted by these transmitting antennas, and this method primarily comprises:

a preliminary step of determining the position of each wheel, consisting in the calculation, for each of these wheel positions, of the coordinates $\overrightarrow{LA_j}$ of the "ideal position" (the reference centroid) of reception of the transmitting antennas covering said wheel position (reception rate equal to 100%), a method of locating each electronic module, consisting in determining the coordinates of the "actual position" of each electronic module relative to the transmitting antennas fitted on the vehicle, using the rate of reception of the signals transmitted by each transmitting antenna as the criterion for determining this "actual position".

This method is found to perform very well in practice in terms of reactivity and reliability when used on vehicles having two axles and equipped with only three transmitting antennas.

Furthermore, this location method may also be used on all types of vehicles fitted with tires, regardless of the number of axles on which the tires are placed.

According to a first advantageous embodiment, weighting coefficients $w_i$ are defined, corresponding to the actual values of the rates of reception $T_i$ of the signals transmitted by the transmitting antennas.

However, notably when the reception rates are relatively low and are found to be non-determining, another advantageous embodiment designed to increase the reactivity and reliability of the location procedure consists in:

defining two threshold values of the reception rates $T_i$, corresponding to a minimum value $T_{min}$ and a maximum value $T_{max}$ of said reception rates, defining weighting coefficients $w_i$ such that $w_i=0$ if $T_i \leq T_{min}$ $w_i=(T_i-T_{min})/(T_{max}-T_{min})$ if $T_{min} \leq T_i \leq T_{max}$ $w_i=1$ if $T_i \geq T_{max}$.

For the same purpose, according to a variant embodiment of the method according to the invention, another way of defining the weighting coefficients consists in assuming that the reception rates $T_i$ follow a normal distribution with a mean $\mu$ and standard deviation $\sigma$, and defining weighting coefficients $w_i$ such that:

$$W_i = F(T_i) = \frac{\int_0^{T_i} e^{-\frac{1}{2}\left(\frac{x-\mu}{\sigma}\right)^2} dx}{\int_0^1 e^{\frac{1}{2}\left(\frac{x-\mu}{\sigma}\right)^2} dx}$$

The aforesaid two methods of defining the weighting coefficients may also be advantageously combined, resulting in a method of determination using two threshold values $T_{min}$ and $T_{max}$ such that:

$(T_{min}+T_{max})/2=\mu$ $(T_{min}-T_{max}) \approx 2.5\sigma$

The coordinates $\overrightarrow{TA_i}$ of each transmitting antenna may also be defined in any known type of reference frame, such as, notably, an orthonormal reference frame. However, in order to promote a correct distribution of the reference centroids, the coordinates $\overrightarrow{TA_i}$ of each transmitting antenna are advantageously defined, according to the invention, in a reference frame consisting of a trigonometric unit circle with its center positioned in such a way that said transmitting antennas are distributed along the periphery of said trigonometric unit circle and defined by the following coordinates:

$$\forall i \in [1; N_{TA}], \overrightarrow{TAi} = \begin{pmatrix} \cos\left(\frac{2\pi(i-1)}{N_{TA}}\right) \\ \sin\left(\frac{2\pi(i-1)}{N_{TA}}\right) \end{pmatrix}$$

According to another advantageous embodiment of the invention, the wheel position to be assigned to each of the electronic modules is determined by measuring the Euclidean distances between the centroids $\overrightarrow{WU_i}$ representing the electronic modules and each of the reference centroids $\overrightarrow{LA_j}$.

On the basis of this principle of calculating the Euclidean distance, an area, called the reference area, of predetermined dimensions is also advantageously defined around each reference centroid $\overrightarrow{LA_j}$, this area being centered on said reference centroid, and the electronic module whose centroid $\overrightarrow{WU_i}$ is located in the reference area corresponding to said wheel position is assigned to each wheel position.

Other characteristic objects and advantages of the invention will be evident from the following detailed description which refers to the attached drawings which represent two preferred embodiments of the invention by way of non-limiting example. In these drawings:

FIG. 1 is a schematic top view of a light motor vehicle having a monitoring system associated with transmitting antennas for locating the electronic modules of this monitoring system, FIG. 2 is a graph showing two different modes of determining the weighting coefficients $w_i$ according to the method of the invention, FIG. 3 is a graph showing the distribution in a reference frame, comprising a trigonometric unit circle, of the elements (centroids of the transmitting antennas) defined according to the method of the invention, and FIG. 4 is a schematic top view of a heavy motor vehicle having a monitoring system associated with transmitting antennas for locating the electronic modules of this monitoring system.

The purpose of the method according to the invention is to locate the electronic modules fitted to the wheels of vehicles having system for monitoring the operating parameters of the tires mounted on these wheels, and this location method consists in using transmitting antennas mounted on vehicles for its execution.

According to FIG. 1, in the first place, the monitoring system is installed in a light vehicle 1 having four wheels, each fitted in a conventional way with a tire, namely two front wheels 2, 3 and two rear wheels 4, 5.

This monitoring system conventionally comprises, in the first place, associated with each wheel 2-5, an electronic module 6-9, for example a module fixed to the rim of said wheel so as to be positioned within the tire casing.

In a known way, each of these electronic modules 6-9 incorporates sensors dedicated to the measurement of parameters such as the pressure and/or temperature of the tire, connected to a microprocessor having an identification code of said electronic module, and connected to an RF transmitter connected to a low frequency antenna such as 10.

The monitoring system also comprises a centralized computer or central unit 11, having a microprocessor and incorporating an RF receiver equipped with an antenna 12 for receiving the signals emitted by each of the four electronic modules 6-9.

Usually, such a monitoring system, and notably its central unit 11, is designed so as to inform the driver of any abnormal change in the parameters measured by the sensors associated with the wheels 2-5.

The method according to the invention for locating the electronic modules 6-9 consists in using transmitting antennas 13-15 connected to the central unit 11 and each positioned near a pair of left wheels 2, 4, right wheels 3, 5, or rear wheels 4, 5.

According to this location method, the transmitting antennas 13-15 are advantageously formed by antennas of a device usually known by the term "hands-free access device", adapted to allow access to the vehicle 1 and possibly to start the latter by means of the identification of an electronic badge.

Depending on the arrangement of this hands-free access device, these antennas may be three in number, as shown in FIG. 1, and may consist, respectively, of:
a left antenna 13 positioned on the handle of the front left door of the vehicle, adapted so that its coverage area A1 covers the positions of the left wheels 2, 4,
a right antenna 14 positioned on the handle of the front right door of the vehicle, adapted so that its coverage area A2 covers the positions of the right wheels 3, 5,
and a rear antenna 15 positioned on the handle of the trunk of the vehicle, adapted so that its coverage area A3 covers the positions of the rear wheels 4, 5.

According to FIG. 4, in the second place, the monitoring system is installed in a heavy vehicle 21 having a front axle carrying two wheels such as 22, and two intermediate axles and a rear axle, each carrying two pairs of twin wheels such as 23 and 24.

This monitoring system conventionally comprises, on the one hand, electronic modules mounted on each of the wheels 22-24, such as the electronic module 25 mounted on a front wheel 22 and the electronic modules 26, 27 mounted on two twin wheels 23, 24, and, on the other hand, a centralized computer or central unit 28.

The transmitting antennas for executing the location method according to the invention are seven in number, and consist of:
three right antennas, such as 29, each positioned, longitudinally, between the right wheels 22, 23-24 of two successive axles, so that their respective coverage area, such as $A_n$, covers the positions of two of these right wheels,
three left antennas, such as 30, each positioned, longitudinally, between the left wheels of two successive axles, so that their respective coverage area covers the positions of two of these left wheels,
and a rear antenna 31 positioned so that its coverage area $A_{n+6}$ covers the wheels on the rear axle.

The aim of the location method according to the invention is to assign a wheel position to each of the electronic modules of the vehicles 1, 21, and thus:
in the case of the light vehicle 1 shown in FIG. 1, to assign a wheel position to each electronic module 6-9,
in the case of the heavy vehicle 21 shown in FIG. 4, to assign:
a wheel position to each of the electronic modules 25 mounted on the front axle which carries only two wheels such as 22,
a wheel position common to the two wheels such as 23, 24 of each pair of twin wheels.

To achieve this aim, the method according to the invention consists, in general terms, in:
defining the coordinates of each transmitting antenna 13-15, 29-31 in a predetermined geometric reference frame,
determining, in the geometric reference frame, the coordinates of each wheel position and the coordinates of each electronic module 6-9, 25-27, by centroid calculations using weighting coefficients consisting of values representative of the rates of reception of the signals transmitted by the transmitting antennas 13-15, 29-31, and deducing from the relative position between each wheel position and each electronic module 6-9, 25-27 the wheel position to be assigned to each of said electronic modules.

One of the preliminary steps of this location method consists in determining the weighting coefficients $w_i$ used in the centroid calculations.

A customary procedure is that of assigning to these weighting coefficients $w_i$ the actual values of the rates of reception $T_i$ of the signals transmitted by the transmitting antennas 13-15, 29-31.

However, notably when the reception rates are relatively low, the values of the weighting coefficients may be found to be non-determining, and the invention advantageously proposes two different methods for determining these weighting coefficients, as well as a method combining these two methods.

The first of the methods consists in using the distribution function of the reception rate $T_i$, on the further assumption that this reception rate $T_i$ follows a normal distribution with a mean $\mu$ and a standard deviation $\sigma$.

This method results in the definition of weighting coefficients $w_i$ such that:

$$W_i = F(T_i) = \frac{\int_0^{T_i} e^{-\frac{1}{2}(\frac{x-\mu}{\sigma})^2} dx}{\int_0^1 e^{-\frac{1}{2}(\frac{x-\mu}{\sigma})^2} dx}$$

By way of example, the curve $F(T_i)$ in FIG. 2 shows the distribution function for determining the weighting coefficients $w_i$ corresponding to the values $\mu=40\%$ and $\sigma=15\%$.

The second method consists in defining two threshold values of the reception rates $T_i$, corresponding to a minimum value $T_{min}$ and a maximum value $T_{max}$ of said reception rates, and then determining the weighting coefficients $w_i$ such that:

$w_i=0$ if $T_i \leq T_{min}$ $w_i=(T_i-T_{min})/(T_{max}-T_{min})$ if $T_{min} \leq T_i \leq T_{max}$ $w_i=1$ if $T_i \geq T_{max}$.

Regarding these two calculation methods, it should be noted that the various parameters such as $\mu$, $\sigma$, $T_{min}$, $T_{max}$ are determined, in the usual way, on the basis of the theoretical and/or experimental results of studies of the LF transmission performances between the transmitting antennas 13-15, 29-31 and the electronic modules 6-9, 25-27.

The preceding two methods may also be combined to produce a third method consisting in using the second method described above as a first-order approximation of the distribution function of a normal distribution.

According to this third method, for $T_i=\mu$ the slope of the straight line connecting $T_{min}$ to $T_{max}$ is equal to $$\frac{1}{\sigma\sqrt{2\pi}} \approx \frac{1}{2.5\sigma},$$

and the two values $T_{min}$, $T_{max}$ are therefore such that:

$-(T_{min}+T_{max})/2=\mu$, $(T_{min}-T_{max})2.5\sigma$

By way of example, the curve $U(T_i)$ of FIG. 2 represents the curve for determining, according to this third method, the weighting coefficients $w_i$ corresponding to the same values $\mu=40\%$ and $\sigma=15\%$ as those corresponding to the curve $F(T_i)$.

A second preliminary step of the location method according to the invention consists in determining a geometric reference frame, and, advantageously, the selected geometric reference frame consists in a trigonometric unit circle CT with its center positioned in such a way that the $N_{TA}$ transmitting antennas 13-15, 29-31 of a vehicle 1, 21 (where $N_{TA}=3$ for the vehicle 1 of FIG. 1 and $N_{TA}=7$ for the vehicle 21 of FIG. 4), are distributed along the periphery of said trigonometric unit circle and defined by the following coordinates:

$$\forall i \in [1; N_{TA}], \overrightarrow{TA_i} = \begin{pmatrix} \cos\left(\frac{2\pi(i-1)}{N_{TA}}\right) \\ \sin\left(\frac{2\pi(i-1)}{N_{TA}}\right) \end{pmatrix}$$

A third preliminary step consists in determining, in the geometric reference frame CT, for each wheel position, the coordinates of the reference centroid $\overrightarrow{LA_j}$ of the transmitting antennas 13-15, 29-31 whose coverage area covers said wheel position, to each of which is assigned a weighting coefficient $w_i$ in the form of a value representative of a 100% rate of reception $T_i$ of the signals transmitted by said transmitting antenna.

Regardless of the method of determining the weighting coefficients $w_i$ described above ($w_i=T_i$, or one of the three methods detailed), the value of $w_i$ representative of a 100% rate of reception $T_i$ is equal to one, and therefore the coordinates of each centroid $\overrightarrow{LA_j}$ are such that:

$$\forall j \in [1; N_{LA}], \overrightarrow{LA_j} = \frac{1}{\text{card}(E_i)} \sum_{i \in E_i} \overrightarrow{TA_i},$$

where $N_{LA}$ is the number of wheel positions card($E_i$) is the number of transmitting antennas whose coverage area covers the wheel position in question.

Additionally, once the coordinates of each reference centroid $\overrightarrow{LA_j}$ have been determined, the method according to the invention consists in defining, around the latter, an area Z1-Z4 of predetermined dimensions, centered on said reference centroid, forming a reference area in which an electronic module 6-9, 25-27 must be located to enable the corresponding wheel position to be assigned to it.

The surfaces of these reference areas Z1-Z4 are defined on the basis of the theoretical and/or experimental results of studies of the LF transmission performances between the transmitting antennas 13-15, 29-31 and the electronic modules 6-9, 25-27. It should also be noted that, according to the invention, the surfaces of these areas Z1-Z4 may differ from one another, on the sole condition that discrete areas are provided.

Once the preliminary steps have been executed, each location procedure consists in the following steps, according to the invention, for each electronic module 6-9, 25-27:

defining the coordinates of the centroid $\overrightarrow{WU_i}$ of the $N_{TA}$ transmitting antennas 13-15, 29-31, to each of which is assigned a weighting coefficient $w_i$ representative of the rate of reception $T_i$, by said electronic module, of the signals transmitted by said transmitting antenna, and verifying that this centroid $\overrightarrow{WU_i}$ belongs to one of the reference areas Z1-Z4 in order to determine which wheel position is to be assigned to this electronic module 6-9, 25-27.

FIG. 3 is a graphic representation of the method of the invention when it is used for locating the electronic modules 6-9 of the vehicle 1 shown in FIG. 1.

For this type of vehicle 1, and in the first place, the coordinates of the transmitting antennas may be as follows:

left antenna 13 $\overrightarrow{TA_1}=(1.0)$, right antenna 14 $\overrightarrow{TA_2}=(-1/2,\sqrt{3}/2)$, rear antenna 15 $\overrightarrow{TA_3}=(-1/2,-\sqrt{3}/2)$, On this basis, the coordinates of the reference centroids, deduced from the coordinates of the antennas 13-15, are as follows:

left front wheel position $\overrightarrow{LA_1}=\overrightarrow{TA_1}=(1.0)$, right front wheel position $\overrightarrow{LA_2}=\overrightarrow{TA_2}=(-1/2,-\sqrt{3}/2)$, right rear wheel position $\overrightarrow{LA_3}=(\overrightarrow{TA_2}+\overrightarrow{TA_3})/2=(-1/2,0)$, left rear wheel position $\overrightarrow{LA_4}=(\overrightarrow{TA_1}+\overrightarrow{TA_3})/2=(1/4,-\sqrt{3}/2)$.

In each location procedure, each centroid $\overrightarrow{WU_i}$ is such that $\overrightarrow{WUi}=w1\ \overrightarrow{TA_1}+w2\ \overrightarrow{TA_2}+w3\ \overrightarrow{TA_3}$.

The calculation of the position of each centroid $\overrightarrow{WU_i}$ may therefore be broken down into two calculation steps, as shown in FIG. 3, namely:

a first step of calculating the points $w_i\ \overrightarrow{TA_i}$, and a second step of calculating the centroid of the three points $w_i\ \overrightarrow{TA_i}$.

Finally, the assignment of a wheel position to the electronic module represented by the centroid $\overrightarrow{WU_i}$ consists in determining the reference area in which this centroid is positioned. According to the illustrated example, this reference area consists in the reference area Z2, so that the right front wheel position is assigned to the electronic module.

As described above, the location method according to the invention can be used in any type of vehicle fitted with tires, regardless of the number of axles on which the tires are placed. Furthermore, regardless of the number of axles and therefore regardless of the number of electronic modules and the number of wheel positions to be assigned, this location method is found to perform very well in terms of reactivity and reliability.

The invention claimed is:

1. A method of locating the positions of wheels (2-5) of a vehicle (1) equipped with an electronic module (6-9) adapted to transmit to a central unit (11), mounted on the vehicle (1), signals comprising data representative of operating parameters of each wheel (2-5) and an identification code of said electronic module, said location method comprising:

equipping the vehicle (1) with $N_{TA}$ transmitting antennas (13-15) positioned in such a way that the coverage area (A1-A3) of each transmitting antenna (13-15) covers at least one wheel position, and that the total coverage area of all the transmitting antennas (13-15) covers all the wheel positions (2-5), successively commanding the transmission of a predetermined number of identification request signals by each transmitting antenna (13-15), calculating values which are representative, for each electronic module (6-9), of the rate of reception $T_i$ by the module of the signals transmitted by each of the transmitting antennas (13-15), and executing a location procedure which is adapted, by analysis of the values representative of the reception rates $T_i$, to enable a wheel position to be assigned to each electronic module (6-9), said location method being characterized in that:

in a preliminary step, a predetermined geometric reference frame (CT) is defined, and the following are defined within this reference frame:

the coordinates $\overrightarrow{TA_i}$ of each transmitting antenna (13-15), for each wheel position, the coordinates of the centroid $\overrightarrow{LA_j}$, called the reference centroid, of the transmitting antennas (13-15) whose coverage area (A1-A3) covers said wheel position, to each of which is assigned a weighting coefficient $w_i$ in the form of a value representative of a 100% rate of reception $T_i$ of the signals transmitted by said transmitting antenna, the following location procedures are executed:

defining, for each electronic module (6-9), the coordinates of the centroid $\overrightarrow{WU_i}$ of the $N_{TA}$ transmitting antennas, to each of which is assigned a weighting coefficient $w_i$ in the form of a value representative of the rate of reception $T_i$, by said electronic module, of the signals transmitted by said transmitting antenna, and determining, on the basis of the relative position between the reference centroids $\overrightarrow{LA_j}$ and each of the centroids $\overrightarrow{WU_i}$, representative of an electronic module (6-9), the wheel position to be assigned to each of said electronic modules.

2. The location method as claimed in claim 1, wherein weighting coefficients $w_i$ are defined, corresponding to the actual values of the rates of reception $T_i$ of the signals transmitted by the transmitting antennas (13-15).

3. The location method as claimed in claim 1, wherein:

two threshold values of the reception rates $T_i$ are defined, corresponding to a minimum value $T_{min}$ and a maximum value $T_{max}$ of said reception rates, and weighting coefficients $w_i$ are defined such that $w_i=0$ if $T_i \leq T_{min}$ $w_i=(T_i-T_{min})/(T_{max}-T_{min})$ if $T_{min} \leq T_i \leq T_{max}$ $w_i=1$ if $T_i \geq T_{max}$.

4. The location method as claimed in claim 3, further comprising assuming that the reception rates $T_i$ follow a normal distribution with a mean of $\mu$ and a standard deviation of $\sigma$, and defining weighting coefficients $w_i$ such that:

$$W_i = F(T_i) = \frac{\int_0^{T_i} e^{-\frac{1}{2}\left(\frac{x-\mu}{\sigma}\right)^2} dx}{\int_0^1 e^{\frac{1}{2}\left(\frac{x-\mu}{\sigma}\right)^2} dx}.$$

5. The location method as claimed in claim 4, wherein two threshold values $T_{min}$ and $T_{max}$ are defined, such that:

$(T_{min}+T_{max})/2=\mu$, $(T_{min}-T_{max})\approx 2.5\sigma$.

6. The location method as claimed in claim 1, wherein the coordinates $\overrightarrow{TA_i}$ of each transmitting antenna (13-15) are defined in a reference frame consisting of a trigonometric unit circle (CT) with its center positioned in such a way that said transmitting antennas are distributed along the periphery of said trigonometric unit circle and defined by the following coordinates:

$$\forall i \in [1; N_{TA}], \overrightarrow{TA_i} = \begin{pmatrix} \cos\left(\frac{2\pi(i-1)}{N_{TA}}\right) \\ \sin\left(\frac{2\pi(i-1)}{N_{TA}}\right) \end{pmatrix}.$$

7. The location method as claimed in claim 1, wherein the wheel position to be assigned to each of the electronic modules (6-9) is determined by measuring the Euclidean distances between the centroids $\overrightarrow{WU_i}$ representative of said electronic modules and each of the reference centroids $\overrightarrow{LA_j}$.

8. The location method as claimed in claim 7, wherein:
an area (Z1-Z4), called the reference area, of predetermined dimensions is also advantageously defined around each reference centroid $\overrightarrow{LA_j}$, this area being centered on said reference centroid, and the electronic module (6-9) whose centroid $\overrightarrow{WU_i}$ is located in the reference area (Z1-Z4) corresponding to said wheel position is assigned to each wheel position.

9. The location method as claimed in claim 1 assuming that the reception rates $T_i$ follow a normal distribution with a mean of $\mu$ and a standard deviation of $\sigma$, and defining weighting coefficients $w_i$ such that:

$$W_i = F(T_i) = \frac{\int_0^{T_i} e^{-\frac{1}{2}\left(\frac{x-\mu}{\sigma}\right)^2} dx}{\int_0^1 e^{\frac{1}{2}\left(\frac{x-\mu}{\sigma}\right)^2} dx}.$$

10. The location method as claimed in claim 2, wherein:
two threshold values of the reception rates $T_i$ are defined, corresponding to a minimum value $T_{min}$ and a maximum value $T_{max}$ of said reception rates,
weighting coefficients $w_i$ are defined such that $w_i=0$ if $T_i \leq T_{min}$ $w_i=(T_i-T_{min})/(T_{max}-T_{min})$ if $T_{min} \leq T_i \leq T_{max}$ $w_i=1$ if $T_i \geq T_{max}$.

11. The location method as claimed in claim 10, assuming that the reception rates $T_i$ follow a normal distribution with a mean of $\mu$ and a standard deviation of $\sigma$, and defining weighting coefficients $w_i$ such that:

$$W_i = F(T_i) = \frac{\int_0^{T_i} e^{-\frac{1}{2}\left(\frac{x-\mu}{\sigma}\right)^2} dx}{\int_0^1 e^{\frac{1}{2}\left(\frac{x-\mu}{\sigma}\right)^2} dx}.$$

12. The location method as claimed in claim 11, wherein two threshold values $T_{min}$ and $T_{max}$ are defined, such that:

$(T_{min}+T_{max})/2=\mu$, $(T_{min}-T_{max})\approx 2.5\ \sigma$.

13. The location method as claimed in claim 2, wherein the coordinates $\overrightarrow{TA_i}$ of each transmitting antenna (13-15) are defined in a reference frame consisting of a trigonometric unit circle (CT) with its center positioned in such a way that said transmitting antennas are distributed along the periphery of said trigonometric unit circle and defined by the following coordinates:

$$\forall i \in [1; N_{TA}], \overrightarrow{TA_i} = \begin{pmatrix} \cos\left(\frac{2\pi(i-1)}{N_{TA}}\right) \\ \sin\left(\frac{2\pi(i-1)}{N_{TA}}\right) \end{pmatrix}.$$

14. The location method as claimed in claim 2, wherein the wheel position to be assigned to each of the electronic modules (6-9) is determined by measuring the Euclidean distances between the centroids $\overrightarrow{WU_i}$ representative of said electronic modules and each of the reference centroids $\overrightarrow{LA_j}$.

15. The location method as claimed in claim 14, wherein:
an area (Z1-Z4), called the reference area, of predetermined dimensions is also advantageously defined around each reference centroid $\overrightarrow{LA_j}$, this area being centered on said reference centroid, and the electronic module (6-9) whose centroid $\overrightarrow{WU_i}$ is located in the reference area (Z1-Z4) corresponding to said wheel position is assigned to each wheel position.

\* \* \* \* \*